(12) United States Patent
Pasquier et al.

(10) Patent No.: US 8,268,071 B2
(45) Date of Patent: Sep. 18, 2012

(54) SULFOALUMINOUS CLINKER AND METHOD FOR PREPARING SAME

(75) Inventors: Michel Pasquier, Lyons (FR); Laury Barnes-Davin, Grenoble (FR); Guy Beauvent, Wierre Effroy (FR)

(73) Assignee: VICAT, Paris la Defense (FR)

( * ) Notice: Subject to any disclaimer, the term of this patent is extended or adjusted under 35 U.S.C. 154(b) by 0 days.

(21) Appl. No.: 13/141,398

(22) PCT Filed: Jan. 28, 2010

(86) PCT No.: PCT/FR2010/050132
§ 371 (c)(1),
(2), (4) Date: Sep. 2, 2011

(87) PCT Pub. No.: WO2010/086555
PCT Pub. Date: Aug. 5, 2010

(65) Prior Publication Data
US 2011/0308431 A1 Dec. 22, 2011

(30) Foreign Application Priority Data

Jan. 28, 2009 (FR) .................................... 09 50506
Oct. 21, 2009 (FR) .................................... 09 57387

(51) Int. Cl.
C04B 7/32 (2006.01)
C04B 7/345 (2006.01)
C04B 28/06 (2006.01)
C04B 28/02 (2006.01)

(52) U.S. Cl. ......... 106/693; 106/692; 106/694; 106/695

(58) Field of Classification Search .................. 106/692, 106/693, 694, 695
See application file for complete search history.

(56) References Cited

U.S. PATENT DOCUMENTS

| 5,509,962 | A | 4/1996 | Tang |
| 6,602,343 | B1 | 8/2003 | Costa et al. |
| 7,527,688 | B2 | 5/2009 | Bingamon et al. |
| 7,850,776 | B2 * | 12/2010 | Gartner et al. ................. 106/692 |
| 7,998,267 | B2 * | 8/2011 | Gartner et al. ................. 106/692 |
| 2011/0259247 | A1 * | 10/2011 | Walenta et al. ............... 106/769 |

FOREIGN PATENT DOCUMENTS

| EP | 0039613 A | 11/1981 |
| EP | 2105419 A1 * | 4/2009 |
| FR | 2873366 A | 1/2001 |
| FR | 2940274 A1 * | 6/2010 |
| FR | 2940275 A1 * | 6/2010 |
| WO | WO2010070214 A1 * | 6/2010 |
| WO | WO2010070215 A1 * | 6/2010 |

OTHER PUBLICATIONS

Beretka et al., "Influence of C4A3S Content and W/S Ratio on the Performance of Calcium Sulfoaluminate-based Cements" Cement and Concrete Research, 26(11):1673-1681 (1966).

Arjunan et al., "Sulfoaluminate-belite Cement from Low-calcium Fly Ash and Sulfur-rich and Other Industrial by-products" Cement and Concrete Research, 29(8):1305-1311 (1999).

Glasser et al., "High-performance Cement Matrices Based on Calcium Sulfoaluminate-belite Compositions" Cement and Concrete Research, 31(12):1881-1886 (2001).

Majling et al., "Generalized Bogue Computations to Forecast the Mineralogical Composition of Sulfoaluminate Cements Based on Fly Ashes", Advances in Cement Research, 11(1):27-34 (1999).

Mehta et al., "Investigations on Energy-Saving Cements", World Cement Technology, Cement and Concrete Association, pp. 166-177 (1980).

* cited by examiner

Primary Examiner — Anthony J Green
(74) Attorney, Agent, or Firm — Porzio, Bromberg & Newman, P.C.

(57) ABSTRACT

The invention relates to a novel sulfoaluminous clinker, to a method for preparing said clinker, and to the use of said clinker for preparing a hydraulic binder and subsequently grout, concrete, or mortar.

15 Claims, No Drawings

SULFOALUMINOUS CLINKER AND METHOD FOR PREPARING SAME

CROSS REFERENCE TO RELATED APPLICATION

This is a National Stage of International Application No. PCT/FR2010/050132, filed 28 Jan. 2010, which claims the benefit of Application No. 09/50506, filed in France on 28 Jan. 2009 and Application No. 09/57387 filed in France on Oct. 21, 2009, the disclosures of which Applications are incorporated by reference herein.

The present invention relates to a novel sulfoaluminous clinker, a process for the preparation of this clinker and the use of the clinker in the preparation of hydraulic binder and subsequently of grout, concrete or mortar.

The manufacture of hydraulic binders and in particular that of cements consists essentially of a calcination of a mixture of carefully chosen and apportioned starting materials, also denoted by the term of "raw meal". The burning of this raw meal gives an intermediate product, the clinker, which, ground with optional supplementary cementing materials, will give cement. The type of cement manufactured depends on the nature and proportions of the starting materials and on the burning process. Several types of cements are distinguished: Portland cements (which represent the vast majority of the cements produced in the world), high alumina (or calcium aluminate) cements, natural quick-setting cements, sulfoaluminous cements, sulfoaluminous-belite cements and other intermediate varieties. As these families are not completely unconnected, it is preferable to describe them by their chemical and mineralogical constituents.

The most widely used cements are Portland cements. Portland cements are obtained from Portland clinker, obtained after clinkering in a kiln at a temperature of the order of 1450° C. a raw meal rich in calcium carbonate.

The preparation of such cements exhibits the disadvantage of releasing a great deal of $CO_2$. The cement industry is thus today searching for a viable alternative to Portland cement, that is to say cements exhibiting at least the same characteristics of strength and of quality as Portland cements but which, during their production, would release less $CO_2$.

Research studies have therefore, in recent years, been directed at "sulfoaluminous" and "sulfobelitic" cements which release less $CO_2$ than Portland cements during their production.

As clinker is the result of a high-temperature calcination, the elements are essentially present in the form of oxides. The clinkers which make possible the preparation of sulfoaluminous cements or sulfobelitic cements relate to a process for the manufacture of a clinker from a raw meal composed of a mixture comprising the compounds $CaCO_3$, $Al_2O_3$ and/or $Al(OH)_3$, $CaSO_4$, $SiO_2$, $Fe_2O_3$ and/or a product containing silica or silicates, such as clay, all these compounds being present in the anhydrous or hydrated form, individually or in combination.

Many sulfoaluminous clinkers have been described in the context of these research studies. Mention may be made, for example, of the international patent application WO 2006/018569, which describes sulfoaluminous-belite clinkers comprising from 5 to 25% of calcium aluminoferrite phase with a composition corresponding to the general formula $C_2AF_{(i-x)}$, with x between 0.2 and 0.8, from 15 to 35% of "yee'limit" calcium sulfoaluminate ($C_4A_3\$$) phase, from 40 to 75% of belite ($C_2S$) and from 0.01 to 10% of one or more minor phases. As mentioned in this patent application, such clinkers comprise, in comparison with the alite ($C_3S$) phase, the main component of Portland cements, a greater amount of belite ($C_2S$) phase, which is entirely beneficial since this results in a reduction in industrial emissions of $CO_2$ and in energy consumption. Moreover, the belite contributes to the development of the long-term strength of the sulfoaluminous-belite cement. However, this patent application does not mention the presence of boron-doped calcium silicate $C_{11}S_4B$ and iron-doped calcium sulfoaluminate $C_4A_{3-y}\$F_y$ phases. Furthermore, nothing is said in this patent application relating to the presence of the $C_2S_\alpha$ polymorph in the $C_2S$ phase.

In point of fact, the polymorphism of the belite ($C_2S$) controls its reactivity or its hydraulicity. The solid solutions with minor elements, such as boron, sodium or potassium, result, to a certain extent, in the crystallographic nature of the belite being varied. The presence of these minor elements, commonly known as mineralizers, can also shift the temperatures at which certain polymorphic varieties appear.

The reactivity of the belite is variable and depends on its form. In the scientific literature, the polymorphs of $C_2S$ appear as follows, as a function of the temnerature:

| $C_2S_\gamma$ | $C_2S_\beta$ | $C_2S_{\alpha'low}$ ($C_2S_{\alpha'l}$) | $C_2S_{\alpha'high}$ ($C_2S_{\alpha'h}$) | $C_2S_\alpha$ |
|---|---|---|---|---|
| 500° C. | 675° C. | 1177° C. | 1425° C. | |

The hydraulic reactivity, that is to say the rate of setting and rise in mechanical strength, decreases from the $C_2S_\alpha$ polymorph to the $C_2S_\gamma$ polymorph. In the case of Portland clinkers, the belite, essentially represented by the $C_2S_\beta$ polymorph, contributes to the long-term compressive mechanical strength, that is to say after time periods of 28 days and beyond. The $C_2S_\alpha$ polymorph is more reactive than the $C_2S_\beta$ polymorph and exhibits a reactivity approaching alite $C_3S$, the predominant phase of Portland clinker. The $C_2S_\alpha$ polymorph furthermore represents an advantageous alternative to the $C_3S$ of Portland clinkers as it makes it possible to approach the reactivity thereof while limiting the $CO_2$ emissions as a result of a lower calcium stoichiometry, thus requiring less carbonate to manufacture it. It is therefore desirable, in a clinker, for the $C_2S_\alpha$ polymorph to be present in the $C_2S$ phase.

Furthermore, the presence of the "yee'limit" calcium sulfoaluminate $C_4A_3\$$ phase or the iron-doped calcium sulfoaluminate $C_4A_{3-y}\$F_y$ phase is necessary for the setting and for the very-short-term compressive mechanical strength of the cement prepared from the clinker The simultaneous presence in the clinker of the belite comprising the $C_2S_\alpha$ polymorph and of the "yee'limit" calcium sulfoaluminate $C_4A_3\$$ phase or of the iron-doped calcium sulfoaluminate $C_4A_{3-y}\$F_y$ phase is thus necessary for the preparation of a high-grade cement.

In point of fact, the $C_2S_\alpha$ polymorph appears above 1425° C. A large amount of energy is necessary in order to reach such a temperature, which results in significant $CO_2$ emissions during the preparation of the clinker. Furthermore, at this temperature, the "yee'limit" calcium sulfoaluminate $C_4A_3\$$ phase is already strongly resorbed in mayenite $C_{12}A_7$, which is harmful to the final quality of the clinker. Furthermore, this resorption is accompanied by a release of $SO_2$ incompatible with the operation of an environmentally friendly industrial plant. Identical phenomena are observed for the iron-doped calcium sulfoaluminate $C_4A_{3-y}\$F_y$ phase.

Consequently, it is impossible to reconcile the presence of "yee'limit" ($C_4A_3\$$) or of iron-doped calcium sulfoaluminate $C_4A_{3-y}\$F_y$, and of reactive belite ($C_2S_\alpha$) when operating at the temperature at which the latter appears (1425° C.). Furthermore, the emissions of $CO_2$ and of $SO_2$ during the preparation of a clinker at such a temperature remain too high from the viewpoint of current and future ecological constraints.

There is thus a need to identify novel clinkers which can be prepared at lower temperatures than 1425° C. while providing for the presence of belite ($C_2S$) comprising the $C_2S_\alpha$ polymorph and of "yee'limit" ($C_4A_3\$$) or of iron-doped calcium sulfoaluminate $C_4A_{3-y}\$F_y$.

Furthermore, during the preparation of clinkers, a person skilled in the art regularly has to face up to problems of adhesion of the materials to the walls of the kiln during the burning of the raw meals. These adhesion phenomena are mainly due to the presence of iron in the raw meals used for the preparation. There is thus also a need to identify novel clinkers which can be prepared from iron-rich raw meals without, however, increasing the appearance of the adhesion phenomena.

Novel sulfoaluminous clinkers have now been found which make it possible to solve these technical problems and which make it possible in particular to obtain belite $C_2S$ comprising the $C_2S_\alpha$ polymorph at temperatures well below 1425° C., thus making it possible to obtain a clinker comprising both a $C_2S$ phase comprising the $C_2S_\alpha$ polymorph and a "yee'limit" calcium sulfoaluminate $C_4A_3\$$ phase or an iron-doped calcium sulfoaluminate $C_4A_{3-y}\$F_y$ phase, while greatly reducing the emissions of $CO_2$ during their preparation.

Furthermore, it has been observed, entirely surprisingly, that such clinkers make possible the preparation of cements exhibiting a reduced setting time in comparison with the cements prepared from the clinkers described in the international patent application WO 2006/018569, while maintaining a hydraulic reactivity and a strength at least comparable to those of these same cements. The cements thus prepared therefore exhibit the advantage of being able to be employed when the use requires speed or reactivity in cold weather. Speed is necessary in particular during the production of concrete units in a precasting plant, where the rotation of the molds is a determining factor in the profitability of the site, and during the use of ready-mix concrete having rapid setting and rapid kinetics of rise in strength on building sites where a rapid throughput is required. An increased reactivity is also necessary in cold weather, in particular for projects carried out in winter or at high altitude, where the setting has to occur before the possible freezing of the concrete unit.

Furthermore, such clinkers make it possible to reduce the $CO_2$ emissions by approximately 35% during their preparation, in comparison with clinkers of Portland type.

Finally, it has been observed that the simultaneous presence of the calcium aluminoferrite phase with a composition corresponding to the general formula $C_2A_xF_{(-x)}$ and of the iron-doped calcium sulfoaluminate $C_4A_{3-y}\$F_y$ phase in the clinkers according to the present invention makes it possible to burn raw meals having a high iron content without, however, observing an increase in the phenomena of adhesion. This characteristic of the clinkers according to the present invention makes possible the use of a broader range of materials in preparing it, such as, for example, iron-rich bauxite.

The present invention thus relates to a sulfoaluminous clinker comprising, as phase composition, with respect to the total weight of the clinker:

from 5 to 25% of calcium aluminoferrite phase with a composition corresponding to the general formula $C_2A_xF_{(1-x)}$, with x varying from 0.2 to 0.8;

from 15 to 35% of optionally iron-doped calcium sulfoaluminate phase corresponding to the formula $C_4A_{3-y}\$F_y$, with y varying from 0 to 0.5;

from 10 to 50% of belite $C_2S$, said belite comprising at least 3% of $C_2S_\alpha$ polymorph; and from 2 to 25% of boron-doped calcium silicate corresponding to the formula $C_{11}S_4B$.

The clinker according to the present invention makes possible the preparation of cements exhibiting an increased hydraulic reactivity and an increased strength in comparison with the cements described in the prior art. Furthermore, the clinker according to the present invention can be prepared at temperatures not exceeding 1350° C., which limits, on the one hand, the emissions of $CO_2$ and, on the other hand, the destruction of the $C_4A_{3-y}\$F_y$ phase. Finally, the clinkers according to the invention can be prepared from raw meals having a high iron content without, however, observing an increase in the phenomena of adhesion.

In the context of the present invention, the following notations are adopted to denote the mineralogical components of the cement:

C represents CaO;
A represents $Al_2O_3$;
F represents $Fe_2O_3$;
S represents $SiO_2$; and
$ represents $SO_3$.

Thus, for example, the optionally iron-doped calcium sulfoaluminate phase denoted by $C_4A_{3-y}\$F_y$ corresponds in reality to a $(CaO)_4.(Al_2O_3)_{3-y}.SO_3.(Fe_2O_3)_y$ phase.

Furthermore, in the context of the present invention, the proportions expressed in % correspond to percentages by weight with respect to the total weight of the entity (clinker or hydraulic binder) under consideration.

Preferably, the present invention relates to a sulfoaluminous clinker in which the following characteristics are chosen, alone or in combination:

the clinker comprises from 10 to 20% of calcium aluminoferrite $C_2A_xF_{(1-x)}$ phase;
the clinker comprises from 20 to 30% of optionally iron-doped calcium sulfoaluminate $C_4A_{3-y}\$F_y$ phase;
the clinker comprises from 10 to 35% of belite $C_2S$, said belite comprising at least 3% of $C_2S_\alpha$ polymorph; and
the clinker comprises from 5 to 25% of boron-doped calcium silicate $C_{11}S_4B$.

More preferably, the present invention relates to a sulfoaluminous clinker in which the following characteristics are chosen, alone or in combination:

the clinker comprises from 10 to 20% of calcium aluminoferrite $C_2A_xF_{(1-x)}$ phase;
the clinker comprises from 20 to 30% of optionally iron-doped calcium sulfoaluminate $C_4A_{3-y}\$F_y$ phase;
the clinker comprises from 10 to 35% of belite $C_2S$, said belite comprising at least 3% of $C_2S_\alpha$ polymorph; and
the clinker comprises from 10 to 25% of boron-doped calcium silicate $C_{11}S_4B$.

Preferentially, the present invention relates to a sulfoaluminous clinker as described above in which the belite $C_2S$ comprises at least 5%, preferably at least 10%, more preferably at least 20%, more preferably at least 30%, more preferably at least 40% and entirely preferably at least 50% of $C_2S_\alpha$ polymorph.

Other minor phases can appear in the composition of the clinker These minor phases can be composed of free lime CaOf, anhydrite C$, gehlenite $C_2AS$, mayenite $C_{12}A_7$, periclase MgO or perovskite CT, $C_3FT$ or $C_4FT_2$. Preferably, the clinker according to the invention comprises:

less than 3% of CaOf, preferably less than 1% of CaOf;

less than 5% of C$, preferably less than 2% of C$; and/or less than 10% of $C_2AS$, preferably less than 5% of $C_2AS$.

The present invention also relates to a process for the preparation of a clinker as described above, comprising the following steps:
- preparation of a raw meal by apportioning the starting materials in order to introduce the amounts of elements necessary to produce the desired phase composition,
- mixing (optionally by cogrinding) the starting materials,
- burning the mixture of the starting materials at a temperature ranging from 1250° C. to 1350° C., and
- rapid cooling of the clinker.

Preferably, the burning stage of the process according to the present invention is carried out at a temperature ranging from 1280° C. to 1340° C.

The clinker according to the present invention can be prepared from different starting materials, such as red muds, bauxite, limestone, gypsum or any other source of calcium sulfate, boric acid, colemanite, sodium borate hydrate, argillaceous-calcareous marls or byproducts from the aluminum and alumina industry.

The quality of the burning, in particular the observing at every point of an oxidizing atmosphere and of maximum temperatures of 1350° C., is fundamental. The clinkers according to the invention will thus be prepared in a kiln which makes it possible to observe these conditions. Mention may be made, as example of kilns appropriate for preparing the clinkers according to the present invention, of the kiln described in the international patent application published under the number WO-A-2009/122065. The kiln described in this patent application is particularly appropriate for the preparation of clinkers according to the invention as it contributes to the appearance of the kinetics of the phases which are finally desired.

The clinker according to the present invention can be used to prepare a hydraulic binder, for example cement, by grinding and optional addition of gypsum, anhydrite or hemihydrate. The present invention thus also relates to a hydraulic binder comprising a clinker as described above in the ground form. Preferably, the hydraulic binder according to the present invention also comprises a supplementary material formed of gypsum, anhydrite or hemihydrate, in proportions which can range up to 20%.

The hydraulic binder according to the present invention can also comprise supplementary materials of the same type as those used for the Portland cement, such as, for example, limestone, natural and artificial pozzolans, blast furnace slag, fly ash from coal-fired furnaces and silica fumes. This supplementary material is added by mixing before or after the grinding of the constituents, by mixing of the powders or by cogrinding. The setting of the binder is then the result of the activation of the supplementary materials by the clinker; consequently, the saving in $CO_2$ with respect to cement of CEM I type (according to the standard EN 197-1) can be considerable, ranging up to 90% reduction in the $CO_2$ emissions according to the content of supplementary material.

Finally, the present invention also relates to the various products prepared from the binder described above, in particular grouts, concretes and mortars. Thus, another subject matter of the present invention is a grout, a concrete or a mortar comprising the hydraulic binder as described above.

The present invention can be illustrated in an non-limiting manner by the following examples.

EXAMPLE 1

A raw meal was produced with the following starting materials, of which these are the chemical analyses.

| | Limestone | Red mud | Bauxite | Gypsum | Boric acid |
|---|---|---|---|---|---|
| $SiO_2$ (in %) | 2.75 | 7.1 | 26.11 | 0.33 | |
| $Al_2O_3$ (in %) | 0.19 | 13.04 | 39 | 0.31 | |
| CaO (in %) | 52.85 | 4.51 | 2 | 30.31 | |
| MgO (in %) | 0.64 | 0.17 | 0.22 | 0.02 | |
| $Fe_2O_3$ (in %) | 0.37 | 49.52 | 16.22 | 0.13 | |
| $TiO_2$ (in %) | 0.04 | 10.54 | 1.89 | 0.04 | |
| $K_2O$ (in %) | 0.12 | 0.08 | 0.22 | 0.06 | |
| $Na_2O$ (in %) | 0.08 | 4.2 | 0.05 | 0.3 | 0 |
| $P_2O_5$ (in %) | 0.02 | 0.45 | 0.18 | 0.42 | |
| $Mn_2O_3$ (in %) | 0.01 | 0.08 | 0.07 | | |
| $SO_3$ (in %) | 0.33 | 0.26 | 0.05 | 46.58 | |
| $B_2O_3$ (in %) | 0 | 0 | 0 | 0 | 56.29 |
| Other non-volatiles (in %) | 0.04 | 0 | 0.04 | 1.54 | |
| Loss on ignition (in %) | 42.18 | 9.72 | 13.7 | 19.91 | 43.66 |
| Total (in %) | 99.62 | 99.67 | 99.75 | 99.95 | 99.95 |

The term "loss on ignition" is understood to mean the loss in weight observed after burning at 950° C.

Red mud: industrial waste from the treatment of bauxite by the Bayer process (Rio Tinto).

The crystallographic phases: $Fe_2O_3$, goethite, rutile, perovskite, quartz, gibbsite, boehmite, portlandite, calcite and cancrinite.

Bauxite: from Sodicapei: B40, i.e. ±40% of $Al_2O_3$.

Gypsum: industrial byproduct resulting from the manufacture of phosphoric acid.

Technical boric acid.

Intimate mixing was carried out in the following proportions (everything passing at 100 µm):

| | % |
|---|---|
| Limestone | 57.26 |
| Red mud | 8.5 |
| Bauxite | 25.6 |
| Gypsum | 5.1 |
| Boric acid | 3.4 |

Burning in a continuous kiln was carried out at 1290° C. for 30 minutes.

The crystalline phases obtained are as follows:

| Mineralogical composition | % |
|---|---|
| $C_4A_{2.85}\$F_{0.15}$ | 28.0 |
| $C_2S_{\alpha'h}$ | 3.8 |
| $C_2A_{0.6}F_{1.4}$ | 11.8 |
| $C_3FT$ | 14.3 |
| $C_2S_\alpha$ | 14.8 |
| $C_{11}S_4B$ | 23.6 |
| MgO/periclase | 1.4 |
| $C_2AS$/gehlenite | 2.4 |

EXAMPLE 2

The clinker obtained in example 1 was ground with 6% of gypsum, so that the median diameter is 10.5 µm.

The initial set and the final set were determined with the Vicat needle method.

Test specimens of 2×2×2 cm were composed of pure paste at W/C=0.3 and crushed after different time periods.

The results are collated in the following table:

| | | |
|---|---|---|
| Initial set | 61 minutes | |
| Final set | 82 minutes | |
| Compressive strength | 6 hours | 10.1 MPa |
| | 1 day | 43.8 MPa |
| | 4 days | 54.9 MPa |
| | 8 days | 63.2 MPa |
| | 28 days | 73.3 MPa |

The cement thus prepared makes it possible to reconcile a high early-age performance while having a comfortable operating time (initial set at 61 min).

EXAMPLE 3

A raw meal was produced with the following starting materials, of which these are the chemical analyses and the relative amounts.

| | Bauxite Weipa | Gypsum | Limestone filler | Silica Sifraco | Red mud | Boric acid |
|---|---|---|---|---|---|---|
| $SiO_2$ (in %) | 6.47 | 0.51 | 0.51 | 99.53 | 7.60 | |
| $Al_2O_3$ (in %) | 53.79 | 0.23 | 0.12 | 0.13 | 12.68 | |
| CaO (in %) | 1.43 | 31.34 | 54.70 | 0.28 | 5.92 | |
| MgO (in %) | 0.17 | 0.06 | 0.49 | 0.05 | 0.22 | |
| $Fe_2O_3$ (in %) | 9.80 | 0.10 | 0.31 | 0.03 | 46.53 | |
| $TiO_2$ (in %) | 2.70 | 0.04 | 0.01 | 0.01 | 11.20 | |
| $K_2O$ (in %) | 0.03 | 0.04 | 0.03 | 0.01 | 0.10 | |
| $Na_2O$ (in %) | 0.08 | 0.29 | 0.08 | 0.06 | 3.81 | |
| $P_2O_5$ (in %) | 0.10 | 1.08 | 0.03 | 0.00 | 0.51 | |
| $Mn_2O_3$ (in %) | 0.02 | 0.02 | 0.01 | 0.01 | 0.08 | |
| $SO_3$ (in %) | 0.07 | 44.78 | 0.14 | 0.01 | 0.23 | |
| $B_2O_3$ (in %) | | | | | | 56.31 |
| Other nonvolatiles (in %) | 0.00 | 1.36 | 0.05 | 0.00 | 0.07 | |
| Loss on ignition at 950° C. (in %) | 25.23 | 19.92 | 43.50 | 0.21 | 10.60 | 43.69 |
| Total (in %) | 99.89 | 99.77 | 99.98 | 100.33 | 99.55 | 100 |

In order to prepare this raw meal, intimate mixing was carried out in the following proportions:

| Bauxite Weipa | Gypsum | Limestone filler | Silica Sifraco | Red mud | Boric acid |
|---|---|---|---|---|---|
| 18.37% | 5.11% | 57.62% | 7.02% | 11.69% | 0.18% |

This composition is burnt while observing the following protocol:

from ambient temperature to 950° C. with a slope of 15° C./min, stationary phase of 30 min at 950° C., from 950° C. to 1300° C. with a slope of 5° C./min, stationary phase of 30 min at 1300° C., followed by a return to ambient temperature in 10 min.

The mineralogical analysis of the clinker thus obtained is as follows:

| Mineralogical composition | % |
|---|---|
| $C_4A_3\$$ | 28.4 |
| $C_2S_{\alpha'h}$ | 10.2 |
| $C_2A_{0.3}F_{0.7}$ | 16.7 |
| $C_4FT_2$ | 11.4 |
| $C_2S_\alpha$ | 3.3 |
| $C_2S_\beta$ | 23.6 |
| $C_{11}S_4B$ | 2.4 |
| $C_{12}A_7$ | 1.4 |
| $Na_2SO_4$ | 0.9 |
| $C_2AS$/gehlenite | 1.7 |

EXAMPLE 4

The clinker of example 3 is ground with 5% of additional gypsum. The performance is evaluated according to the standard EN 197-1 and test standards associated with it.

Bars of mortar with dimensions of 4×4×16 at W/C=0.5 are produced and the setting time is measured using the Vicat needle.

The results are collated in the following table:

| | | |
|---|---|---|
| Initial set | 75 minutes | |
| Final set | 105 minutes | |
| Compressive strength | 6 hours | 7.5 MPa |
| | 1 day | 18.5 MPa |
| | 7 days | 39.5 MPa |
| | 28 days | 55.2 MPa |

The cement prepared from the clinker of the invention thus exhibits a reduced setting time in comparison with the cements prepared from the clinkers described in the international patent application WO 2006/018569, while maintaining a hydraulic reactivity and a strength at least comparable to those of these same cements.

The invention claimed is:

1. A sulfoaluminous clinker comprising, as phase composition, with respect to the total weight of the clinker:
   from 5 to 25% of calcium aluminoferrite phase with a composition corresponding to the general formula $C_2A_xF_{(1-x)}$, with x varying from 0.2 to 0.8;
   from 15 to 35% of optionally iron-doped calcium sulfoaluminate phase corresponding to the formula $C_4A_{3-y}\$F_y$, with y varying from 0 to 0.5;
   from 10 to 50% of belite $C_2S$, said belite comprising at least 3% of $C_2S$ alpha polymorph; and
   from 2 to 25% of boron-doped calcium silicate corresponding to the formula $C_{11}S_4B$.

2. The clinker as claimed in claim 1, comprising from 10 to 20% of calcium aluminoferrite $C_2A_xF_{(1-x)}$ phase.

3. The clinker as claimed in claim 1, comprising from 20 to 30% of optionally iron-doped calcium sulfoaluminate $C_4A_{3-y}\$F_y$ phase.

4. The clinker as claimed in claim 1, comprising from 10 to 35% of belite $C_2S$, said belite comprising at least 3% of $C_2S$ alpha polymorph.

5. The clinker as claimed in claim 1, comprising from 5 to 25% of boron-doped calcium silicate $C_{11}S_4B$.

6. The clinker as claimed in claim 5, comprising from 10 to 25% of boron-doped calcium silicate $C_{11}S_4B$.

7. The clinker as claimed in claim 1, wherein the belite $C_2S$ comprises at least 30% of $C_2S$ alpha polymorph.

8. The clinker as claimed in claim 1, wherein belite $C_2S$ comprises at least 50% of $C_2S$ alpha polymorph.

9. The clinker as claimed in claim 1, comprising less than 3% of free lime CaO, less than 5% of C$ and/or less than 10% of $C_2AS$.

10. A process for the preparation of a clinker as claimed in claim 1, which comprises the following steps:
    preparation of a raw meal by apportioning starting materials in order to introduce the amounts of elements necessary to produce the composition,
    mixing the starting materials,
    burning the mixture of the starting materials at a temperature ranging from 1250° C. to 1350° C., and
    rapid cooling of the clinker.

11. The process as claimed in claim 10, comprising the step of burning the mixture of starting materials is carried out at a temperature ranging from 1280° C. to 1340° C.

12. A hydraulic binder, comprising a clinker as claimed in claim 1.

13. A grout, comprising a hydraulic binder as claimed in claim 12.

14. A concrete, comprising a hydraulic binder as claimed in claim 12.

15. A mortar, comprising a hydraulic binder as claimed in claim 12.

\* \* \* \* \*